O. H. FLINT.
MOLD CENTERING DEVICE.
APPLICATION FILED JAN. 7, 1920.
1,399,203.
Patented Dec. 6, 1921.
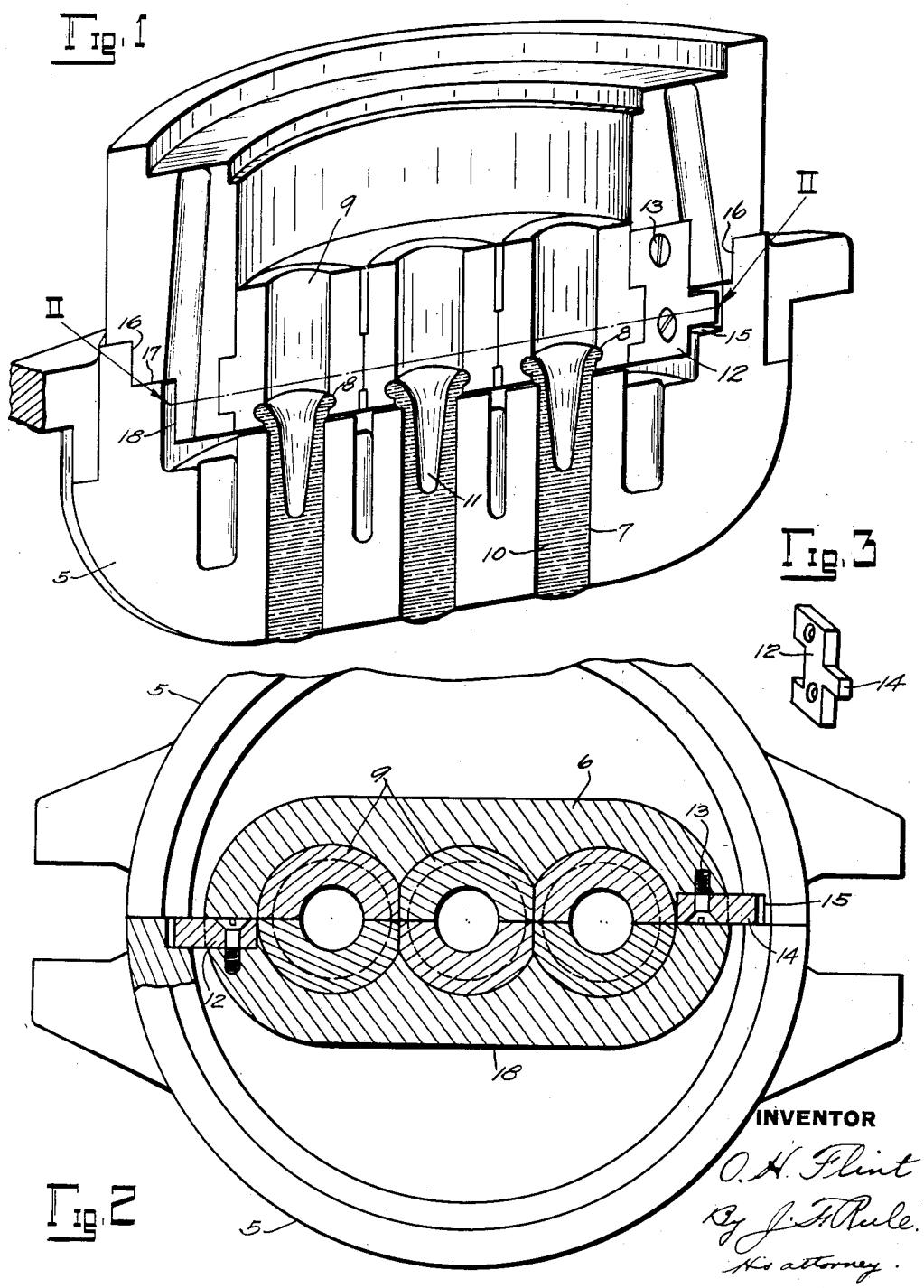

UNITED STATES PATENT OFFICE.

OPHA H. FLINT, OF CLARKSBURG, WEST VIRGINIA, ASSIGNOR TO THE OWENS BOTTLE COMPANY, OF TOLEDO, OHIO, A CORPORATION OF OHIO.

MOLD-CENTERING DEVICE.

1,399,203.  Specification of Letters Patent.  Patented Dec. 6, 1921.

Application filed January 7, 1920. Serial No. 349,873.

*To all whom it may concern:*

Be it known that I, OPHA H. FLINT, a citizen of the United States, residing at Clarksburg, in the county of Harrison and State of West Virginia, have invented a new and useful Mold-Centering Device, of which the following is a specification.

My invention relates to a centering device particularly adapted for use with molds of a glass forming machine. As herein shown the invention is applied to molds designed for use with the well known Owens bottle blowing machines of the type shown, for example, in the United States patent to La France, Number 1,185,687, granted July 6, 1916. In machines of this type there is provided a neck mold and body blank mold which are brought into register while a charge of glass is drawn by suction into the mold cavity and the neck of the bottles formed in the neck mold. The blank mold sections are then separated leaving the blank supported in the neck mold.

The present invention is particularly adapted for use with a mold provided with a number of cavities for simultaneously forming a plurality of blanks. As one or more of the mold cavities are located eccentric to or at one side of the central axis of the mold, any rotation of the neck mold in its support away from normal position will throw the neck mold openings out of register with the mold cavities in the blank mold beneath. The present invention provides a simple and practical means for preventing such displacement of the neck mold while the molds are closed and thus insuring exact register of the neck mold and blank mold cavities.

Other features and advantages of the invention will appear hereinafter.

In the accompanying drawings:

Figure 1 is a perspective showing a blank mold section and neck mold section in register.

Fig. 2 is a plan view of the blank mold, and also showing a portion of the neck mold in section at the plane indicated by the line II—II on Fig. 1.

Fig. 3 is a detail showing one of the centering plates.

The blank mold 5 comprises two sections which are separable horizontally to open the mold. When the mold is closed the inner faces of the mold sections meet in a substantially vertical plane. The auxiliary or neck mold 6 likewise comprises two sections separable horizontally and arranged to be brought together with their inner faces meeting in the same vertical plane with those of the blank mold. The blank mold is formed with mold cavities 7 adapted to register with neck mold cavities 8 formed in the individual neck mold sections or casings 9 which are seated in the body of the neck mold. The blank mold is shaped to surround the neck mold and is formed with an annular vertical wall 16 and horizontal surface 17 which provide an annular recess to receive the correspondingly shaped neck mold. The latter comprises an integral portion 18 (shown in section in Fig. 2) projecting below the surface 17 and formed with recesses in which the parts 9 are seated.

In operation, the neck mold is first closed, the blank mold is then closed around the neck mold and the mold charged by drawing the charges of glass 10 by suction upward to fill the mold cavities. Initial blow openings 11 are formed in the blanks 10 by plungers (not shown), after which the body blank mold sections are separated, leaving the blanks suspended from the neck mold. A finishing mold is then brought into position to register with the neck mold and the blanks blown to finished form.

In order to center the neck mold sections so that the neck mold cavities 8 will be in exact alinement with the mold cavities 7, centering plates 12 are provided which are attached by screws 13 to the neck mold. The latter may be formed with recesses to receive said plates so that the outer faces of the plates will be flush with the face of the neck mold. Each plate 12 is formed with a lug or key 14 projecting outwardly beyond the neck mold to engage a correspondingly shaped recess or keyway 15 formed in the blank mold. With this arrangement if a neck mold section has been slightly rotated or misplaced in its supporting arm it will be automatically returned to its proper position by the closing of the body mold 5. The plates 12 thus serve as centering plates, and when the molds are closed, form locking plates by which the neck mold is locked against rotative displacement.

When a single mold cavity is provided, which is ordinarily arranged centrally of the mold, a slight rotative displacement of the neck mold in its supporting arm is of no moment, as it will still register with the blank mold cavity. When two or more mold cavities are provided (three being herein shown) it becomes important to either prevent any rotative displacement of the neck mold or to re-aline it with the blank mold when the latter closes, because any slight displacement will cause a defect in the finished article. The present invention as above described provides a simple and effective means for preventing or counteracting such displacement.

Modifications may be resorted to within the spirit and scope of my invention.

What I claim is:

The combination of a neck mold comprising horizontally separable sections, a body mold comprising horizontally separable sections arranged to be brought together and surround the neck mold, each of said molds being provided with a plurality of mold cavities arranged to register with those of the other mold, and locking plates removably mounted on the neck mold and comprising lugs or keys projecting radially beyond the neck mold at the inner faces of the mold sections, the body mold being provided with keyways in its inner faces to receive said keys and thereby prevent relative rotation of the molds.

Signed at Clarksburg, in the county of Harrison and State of West Virginia, this 31st day of December, 1919.

OPHA H. FLINT.